United States Patent [19]

Law et al.

[11] 3,757,242

[45] Sept. 4, 1973

[54] AMPLIFIER WITH LONG TERM, DIGITALLY-CONTROLLED D.C. CLAMPING

[75] Inventors: Kenneth J. Law, Southfield; Gordon R. Brown, Livonia, both of Mich.

[73] Assignee: Parke, Davis & Company, Detroit, Mich.

[22] Filed: Feb. 8, 1972

[21] Appl. No.: 224,436

Related U.S. Application Data

[60] Division of Ser. No. 31,850, May 1, 1970, Pat. No. 3,651,465, which is a continuation of Ser. No. 605,704, Dec. 29, 1966, abandoned.

[52] U.S. Cl. .................. 330/129, 328/175, 330/137
[51] Int. Cl. .................. H03g 3/22
[58] Field of Search .................. 330/29, 86, 110, 330/127, 129, 138, 137; 328/175

[56] References Cited

UNITED STATES PATENTS

| | | | |
|---|---|---|---|
| 3,525,948 | 8/1970 | Sherer et al. | 86 X/ |
| 3,315,223 | 4/1967 | Hibbard et al. | 330/86 UX |

*Primary Examiner*—Roy Lake
*Assistant Examiner*—James B. Mullins
*Attorney*—Arthur Raisch, Chester L. Davis, Jr. et al.

[57] ABSTRACT

By way of information and not by way of limitation, a six bit bar code and six clock bars, one clock bar being paired with each bit, are printed on a carton. The bar code positively identifies the article for which the carton is labeled. During a packaging operation the code is scanned and detected and then compared against a reference code identifying the article being placed in the carton. The arrangement of the code bits or code bars relative to the clock bars and to the scanning sequence is such that a complete code is read bit-by-bit into a digital logic circuit only after enabling of the logic circuit by a clock pulse produced in response to the paired clock bar for each bit. This is done by entering the code into a shift register bit-by-bit with register shifting being under the control of the clock bars. If the code read is not true to the reference code, a reject indication is provided or the carton bearing the incorrect code is automatically rejected from the packaging line. Code and clock pulse signals are fed to the register via specially constructed amplifiers whose output levels are clamped by respective control circuits each of which comprise an oscillator, a threshold detector, a counter, and a digital-to-analog convertor. The analog output from the convertor reduces the input signal when the amplifier output goes above the threshold of the detector.

7 Claims, 20 Drawing Figures

PATENTED SEP 4 1973 3,757,242

SHEET 2 OF 4

AMPLIFIER WITH LONG TERM, DIGITALLY-CONTROLLED D.C. CLAMPING

This application is a division of our prior copending U.S. Pat. application Ser. No. 31,850, filed May 1, 1970 (now U.S. Pat. No. 3,651,465), and entitled "Method and Apparatus for Package Inspection and Verification," which in turn is a continuation of our prior copending U.S. Pat. application Ser. No. 605,704, filed Dec. 29, 1966, and entitled "Method and Apparatus for Package Inspection and Verification" (now abandoned).

Properly labeled merchandise is essential with pharmaceuticals where an improper or a defective label might cause serious harm or even death to a patient. The potential risk from an improperly labeled item requires that automated package verification have the greatest reliability. Any improperly labeled package must be detected and false rejects should be minimized. False reject or reject of a package when in fact it is properly labeled is highly undesirable since it can result in unnecessary down time of a packaging line. On the other hand, modern pharmaceutical packaging techniques place stringent high speed requirements on any practical verification system.

A large code repertoire and system capability for veryifying a large number of different articles at high packaging speeds are also high desirable. The code should not impair the attractiveness of the package and code selection is also limited by package size and available locations for the code on the package. Reasonably simple electronics and simple setup and operation are also desirable. The code employed should also be compatible with the overall packaging operation such as inventory and production controls of automated systems. Thus, it is also desirable that the verification code can be fed directly into computers controlling the overall packaging operation without having to convert the verification code into a different code which the computer can accept. Another important requirement is that effective verification be provided at different packaging speeds including zero speed during startup and stop.

The object of the present invention is to provide verification by a method and an apparatus that are effective and satisfy the aforementioned requirements.

Particular objects of the present invention include verification by a method and an apparatus utilizing a basic code having many code variations with the number of variations being easily increased by simple adjustments and modifications depending on the demands of the user.

Further objects of the present invention are to provide a verification code together with the method and apparatus for reading the code to achieve more effective, more efficient, more economical, more versatile and more reliable package verification as compared with prior art techniques.

The present invention contemplates a particular code for positively identifying and verifying the labeling on a package. The present invention is also useful in verifying packages in general, circulars, literature such as instructions or the like and other coded articles. The preferred embodiment uses a basic six bit binary code in the form of bars printed on an end flap of a carton or the like. In accordance with one important feature of the present invention, the bar code is read in response to timing or clock bars also printed on the end flap. The code bars and the clock bars are scanned and read in unison at the same rate and the code is entered in a shift register timed by the clock bars. The code reading is time independent and is independent of the packaging rate. Stated differently, code reading is based on the spatial relationship between any given code bit or bar and its respective clock bar and not upon the spatial separation between code bits. Moreover, the present invention does not require equal spacing or other particular spacing between the code bits per se. The present invention also provides good float tolerances which do not provide a false reject for packages slightly skewed angularly to the direction of travel or packages displaced transversely thereto. The basic code system of the present invention provides a large number of codes and can be added onto to provide still more codes with only slight adjustments or simple modification of system components. The basic code and the basic apparatus are arranged so that basic code systems can be purchased initially and then added onto as required by subsequent demand for more codes.

Other objects, features and advantages of the present invention will become apparent in connection with the following description, the appended claims and the accompanying drawings in which:

Figure 1:
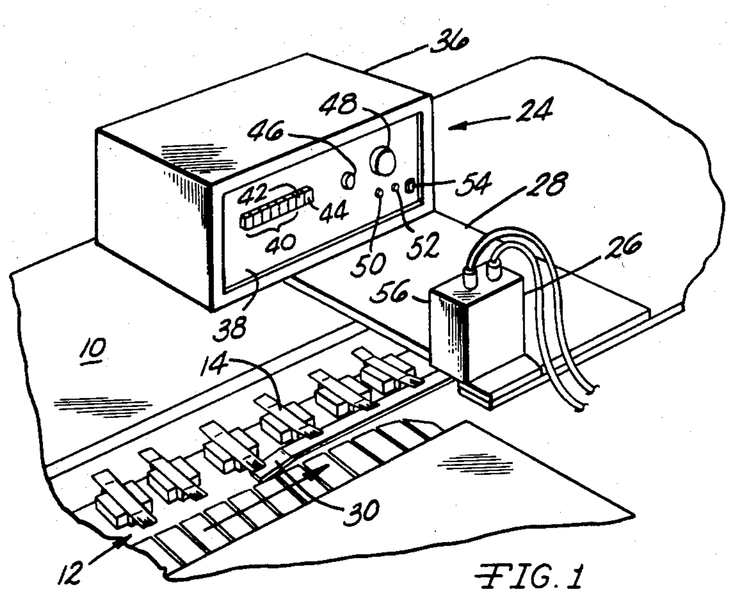
FIG. 1 is a fragmentary perspective view illustrating an inspection station in a pharmaceutical packaging line.
Figure 3A:
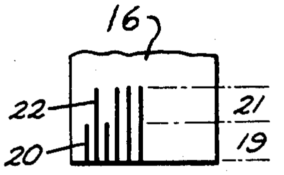
Figure 4:
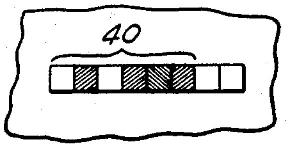
Figure 5:
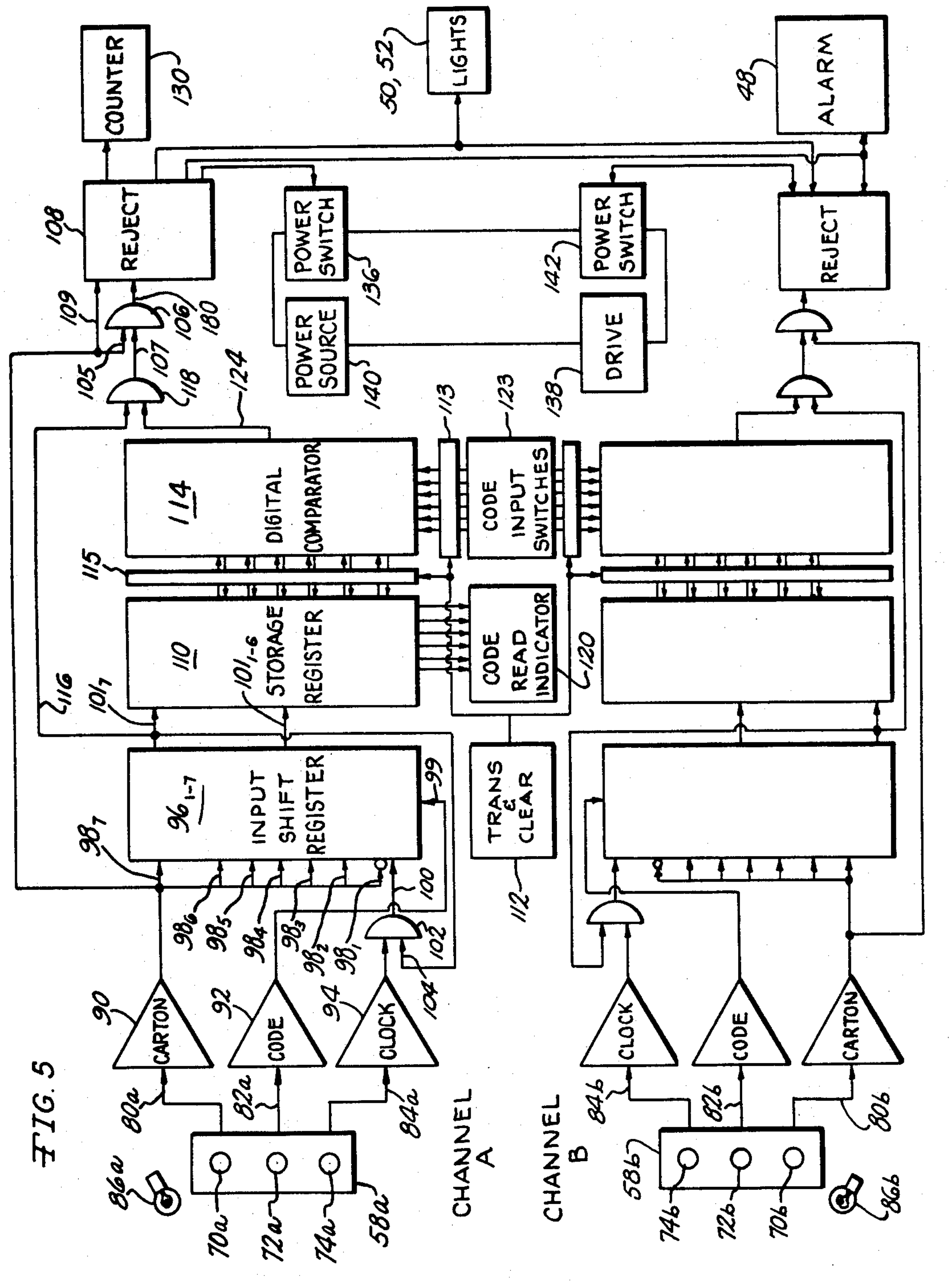
Figures 6, 8A, 8B:
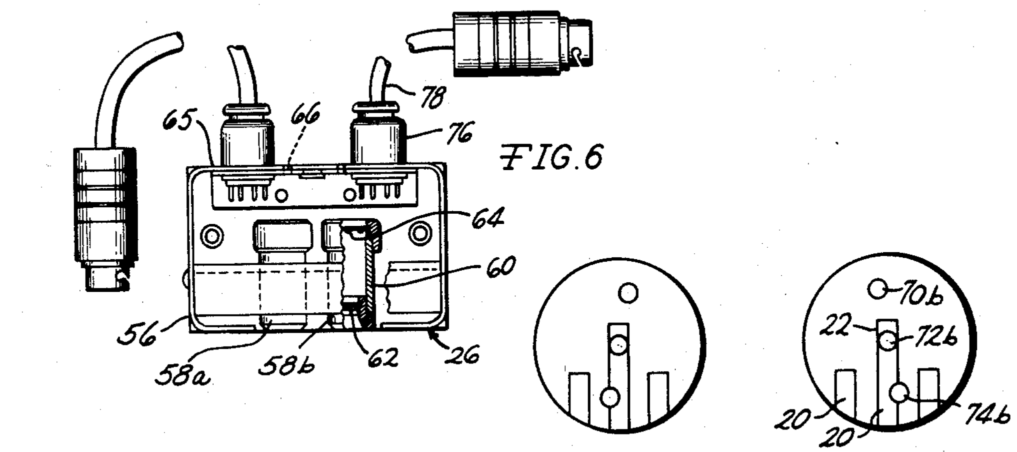
Figures 7, 9A, 9B, 10:
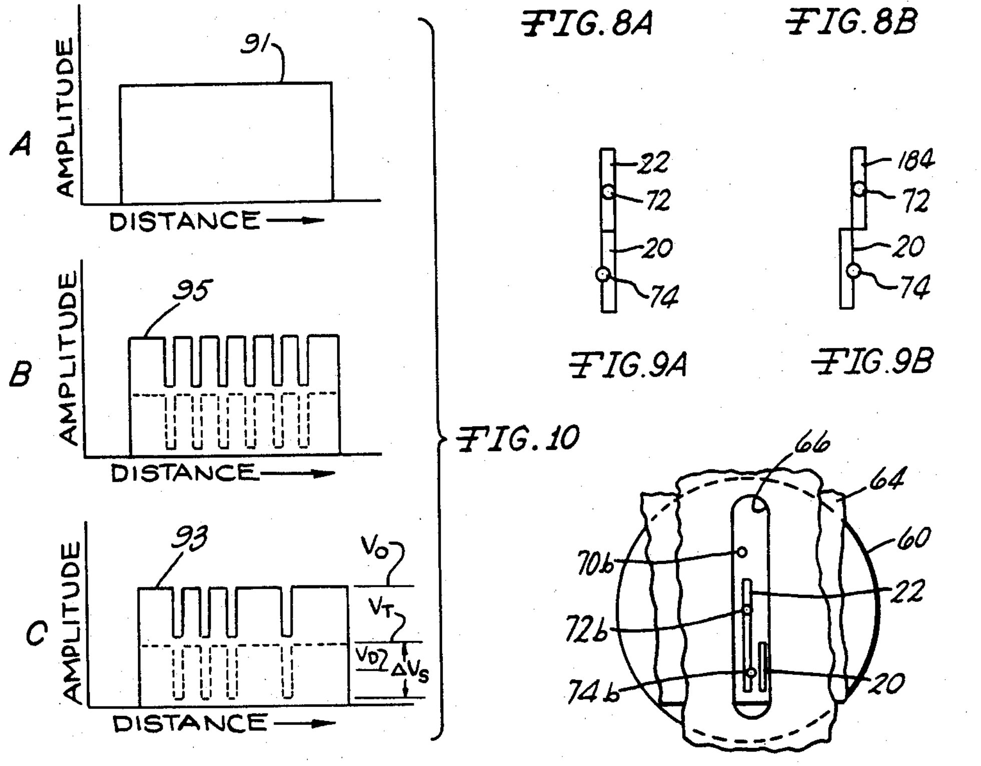
Figure 14:
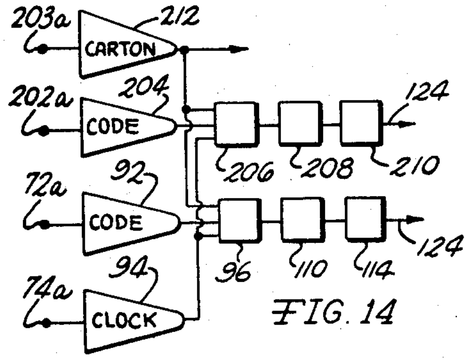
Figure 11:
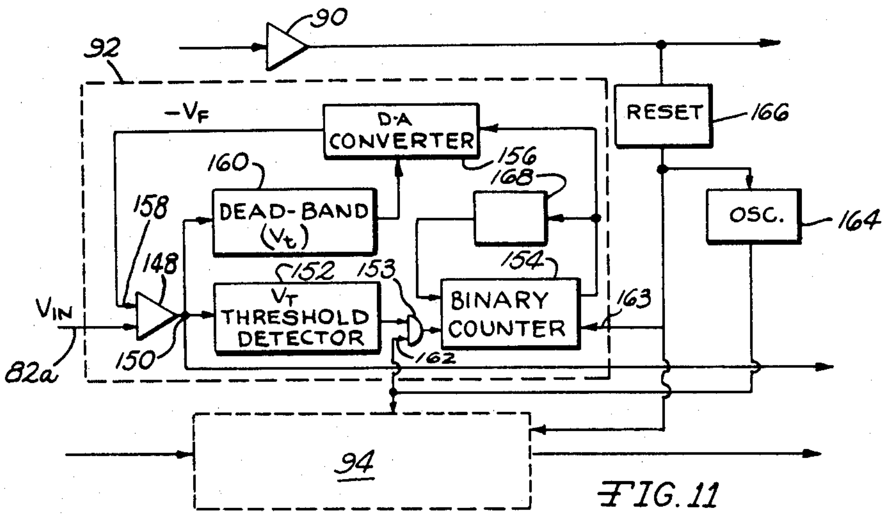
Figure 12:
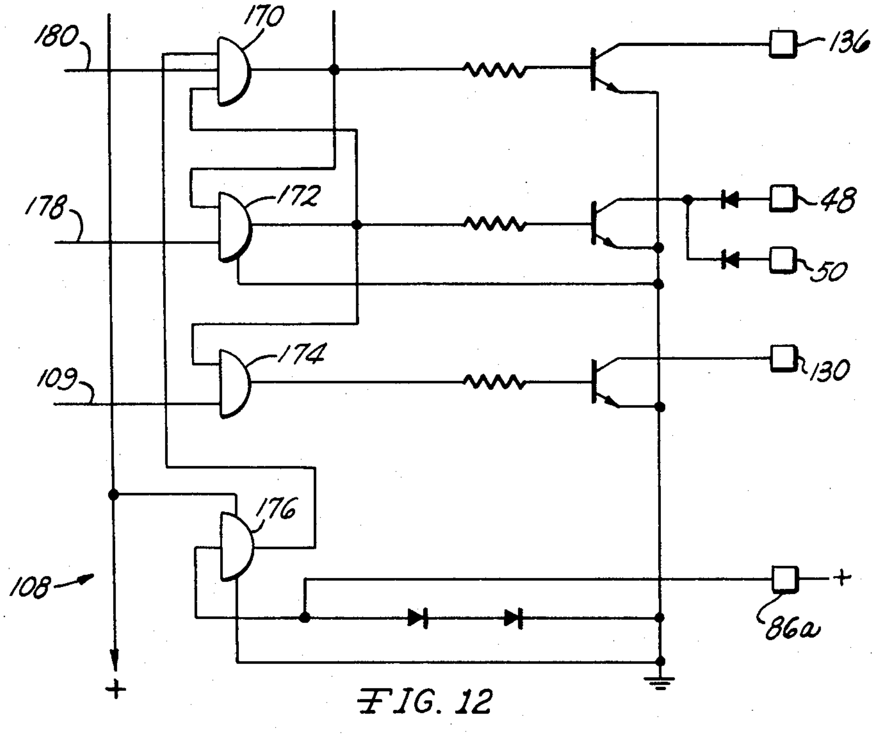
Figure 13:
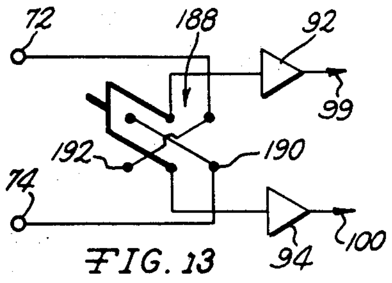

FIG. 3A–E illustrate the basic bar code of the present invention and various modifications therein;

FIG. 4 is a fragmentary front view of a control panel of the inspection device shown in FIG. 1 and illustrates input push button settings corresponding to the bar code of FIG. 3A;

FIG. 5 is a functional block diagram illustrating the circuit of a package inspection and verification system of the present invention;

FIG. 6 is a top view, partly in section, of a scanning head having photocells therein to read the bar code;

FIG. 7 is an enlarged fragmentary view taken from the rear of the head of FIG. 6 and illustrates alignment of the photocells and the bars on the package;

FIGS. 8A and 8B illustrate orientations of the photocells for different directions of travel by the package relative to the scanning head;

FIGS. 9A and 9B illustrate the basic aligned bar code and a phase offset bar code modification, respectively, and their relationship to the photocells;

FIG. 10 illustrates various waveforms in the circuit illustrated in FIG. 5;

FIG. 11 is a block diagram of an operational amplifier to provide gain compensation in the circuit of FIG. 5;

FIG. 12 is a schematic circuit diagram of a portion of a reject circuit in the circuit of FIG. 5;

FIG. 13 is a circuit diagram illustrating a reversing switch in the input circuit for an inverted bar code modification; and FIG. 14 is a block diagram illustrating a modification of the circuit of FIG. 5 for another variation of the bar code.

By way of illustration and not by way of limitation, FIG. 1 illustrates a package inspection and verification station 10 in a pharmaceutical packaging line. An endless conveyor 12 has a plurality of cartons 14 suitably carried thereon. The conveyor 12 moves the cartons 14 in a direction from left to right as viewed in FIG. 1. The inspection station 10 may be placed at a convenient location along the packaging line, for example, immediately following a carton filling station where filled ampules are automatically inserted into the cartons 14. As better illustrated in FIGS. 2 and 3A, each of the cartons 14 has an end flap 16 which bears a code group generally designated by numeral 18. In accordance with an important aspect of the present invention, the code group generally includes a lower row 19 of vertical clock bars 20 and an upper row 21 of code bars 22. The preferred embodiment uses a six bit binary code as the basic code and thus there are six digit places equally spaced apart in the upper row with selected places having bars depending on the particular code. The presence or absence of a code bar 22 represents a "1" or a "0." Correspondingly, there are six clock bars 20 also equally spaced apart in the clock row 19. The code bars 22 are vertically aligned with clock bars 20 so that as viewed in FIG. 3A the clock bars 20 appear as either short bars or as the lower half of the tall bars whereas the code bars appear as the upper half of the tall bars. Thus, for each bit or digit place in the code row 21, there is a respective paired clock bar 20 printed directly therebelow.

Referring back to the inspection station 10 in FIG. 1, the inspection and verification apparatus 24 includes a reading head 26 carried on a suitable mounting plate 28 and disposed above conveyor 12 to read the code group 18 as cartons 14 move past the head 26. Cartons 14 are all arranged on the conveyor 12 with end flaps 16 similarly oriented for viewing by head 26. A guide 30 is arranged on conveyor 12 so that flaps 16 ride over the guide 30 at a fixed viewing distance from head 26. There is a housing 36 for enclosing the components of the circuit illustrated in FIG. 5 and various manual input controls are accessible at a front panel 38 on the housing 36. These controls include at least six code input push buttons 40 for entering the code into the inspection apparatus. These are the first six push buttons from left to right as viewed in FIG. 1. There is also a code "Transfer" push button 42 and a code "Clear" push button 44, a key lock switch 46, an alarm 48 such as a bell or a buzzer, a channel A reject lamp 50, a channel B reject lamp 52 and an on-off switch 54.

In the preferred embodiment of the present invention, the apparatus 24 is a dual channel system designated "Channel A" and "Channel B" in FIG. 5. The two channels "A" and "B" are substantially identical to provide redundancy and therefore high system reliability. Hereinafter, components or elements identical in channels A and B may be identified by suffix letters "*a*" and "*b*" respectively where helpful in describing the invention.

In general, the apparatus 24 is set up by first unlocking the controls by means of the key switch 46. The "Clear" button 44 is punched to clear any existing code in the system and then the selected code is punched on the six switches 40. By way of example for the cartons traveling from left to right as viewed in FIG. 1 and for the particular code illustrated in FIG. 3A, the second, fourth, fifth and sixth ones of push buttons 40, from left to right as viewed in FIG. 1, would be punched as shown in FIG. 4. After the code is entered on buttons 40, the transfer button 42 is punched to transfer the code into the circuit of FIG. 5. The key switch 46 is then operated to lock the code and prevent changing of the code without first again unlocking the key switch 46.

The read head 26 generally comprises a housing 56 (FIGS. 1 and 6) on which a channel A read head 58*a* and a channel B read head 58*b* are mounted side-by-side. Head 26 is disposed relative to conveyor 12 so that the code groups 18 are viewed successively through an opening in the bottom of housing 56, first by head 58*a* and then by head 58*b*. The read heads 58*a*, 58*b* are substantially identical and thus only one of the heads, head 58*b* in channel B, will be described in detail. The head 58*b* comprises a hollow cylinder 60 on which a lens 62 and a photocell mounting plate 64 are mounted. Cylinder 60 is rotatably mounted on housing 56. Plate 64 is a printed circuit card and is made of translucent glass epoxy to also serve as an image plate. The rear wall 65 of housing 56 is apertured at 66 so that the rear of cylinders 60 can be viewed from the rear of the housing 56 without disassembling the head 26. Three photocells 70*b*, 72*b*, and 74*b* are mounted in a line on card 64. Photocell 70*b* responds to entry of a carton 14 into the field of view of the photocell to provide a carton detect signal. In the preferred embodiment, photocell 70*a* is disposed to view the body of a carton 14 and not just an end flap. Photocell 72*b* responds to code bars 22 and photocell 74*b* responds to clock bars 20. Each of the photocells 70*b*, 72*b*, and 74*b* is wired to a jack generally designated 76 and through a cable 78 to the circuit of FIG. 5 as indicated by leads 80*b*, 82*b*, 84*b* (FIG. 5).

In FIGS. 8A and 8B, the aligned photocells 70*b*, 72*b*, 74*b* are canted slightly in one rotational direction or the other depending on the direction of travel of the carton relative to the head 26. FIG. 8B represents the situation wherein carton 14 moves from left to right as viewed in FIG. 1. FIG. 8A represents a situation where the carton is moved from right to left. As shown in FIG. 8B, when a carton 14 enters the field of view of the head 58*b*, the carton detect photocell 70b is the first photo-cell to respond followed in sequence by the code photocell 72*b* and then the clock photocell 74*b*. An actual image may be inverted due to the lenses 62 and the arrangements shown in FIGS. 8A and 8B are intended only to illustrate the principle involved. In FIG. 8B, the photocells are superimposed on the image of the clock bars 20 and the code bars 22 as they appear from the rear of cylinders 60. In the preferred embodiment, the horizontal spacing or offset between photocells 72*b* and 74*b* is one-half the width of bars 20, 22. Thus, when photocell 72*b* is centered on a clock bar 22, the photocell 74*b* will be centered on the leading edge of corresponding code bar 20. This assures the proper sequential response of the photocells 72*b*, 74*b* and further assures time coincidence of the photocell outputs. When the head 26 is set up, the cover of the housing 56 and the jacks 76 are removed so that the cylinders 60 can be rotatably adjusted to focus the image of the code bars 22 and the clock bars 20 onto plate 64 and to properly orient the photocells 70*b*, 72*b*, 74*b*. After head 26 is reassembled, the photocell alignment can be viewed and checked through the aperture 66 as illustrated in FIG. 7. The head 26 also has a pair of lamps 86*a*, 86*b* (FIG. 5), one for each of the heads 58*a*, 58*b*. The lamps 86 (not shown in FIG. 6) are mounted on housing 56 to illuminate the cartons 14.

Referring to the circuit diagram illustrated in FIG. 5, since channel A and channel B are substantially identical, only one of the channels, channel A, will be described in detail. The electrical signals developed by photocells 70*a*, 72*a*, 74*a* are applied through their respective leads 80*a*, 82*a*, 84*a* to respective amplifiers 90, 92, 94 (FIGS. 5 and 11). Amplifier 90 is a carton detect amplifier and its input is a square wave 91 (FIG. 10A) whose duration is determined by the time required for the carton to move past the scanning head 58. Amplifier 92 is a code amplifier and its input is a pulse code 93 (FIG. 10C) with the presence or absence of negative going pulses being determined by the code bars 22. Amplifier 94 is a clock pulse amplifier and its input is a clock pulse train 95 (FIG. 10B) consisting of six spaced apart pulses. For a constant carton velocity, the pulses in train 95 are also equally spaced apart on a time abscissa. The pulse train 95 will contain six clock pulses for each carton regardless of the code printed thereon. As illustrated in FIGS. 9B and 9C, the leading edge of pulses in the clock pulse train 95 lag their corresponding code pulses by one-half the bar width due to the offset of photocells 72*b*, 74*b*. Amplifiers 92, 94 are operational amplifiers having a particular feedback arrangement to achieve an automatic gaincompensation and maintain a predetermined constant output level with variations in the average light intensity at photocells 72, 74.

The signals from amplifiers 90, 92, 94 are fed to an input shift register 96 which includes seven flip-flop stages $96_{1-7}$, one stage for each bit in the six bit code and an extra stage. Register 96 is generally conventional shift register having at least seven reset inputs $98_{1-7}$, a code or counting signal input 99, a clock or shift input 100 and seven outputs $101_{1-7}$. The input $98_1$ to the first stage $96_1$ is inverted as illustrated. The carton detect signal 91 from amplifier 90 is applied to input $98_1$ to preset a "1" into the first stage and to the remaining inputs $98_{2-7}$ to reset the remaining six stages $96_{2-7}$ to "0" when a carton is detected by photocell 70*a*.

The pulse code from amplifier 92 is applied to input 99 to set the first stage in the register 96 according to the number "1" or "0" for each bit in the code. Clock pulses frrom amplifier 94 are applied via an "and" gate 102 to the shift input 100. Gate 102 has an enabling signal applied to its second input 104 from the seventh stage output $101_7$ while the code is being read. The enabling signal is removed to inhibit transfer of noise signals to input 100 after an entire six bit code has been read and transferred to storage as will later be described. The carton detect signal 91 from amplifier 90 is also fed to one input 105 of a gate 106 to block gate 106 and prevent transfer of any signal at the other input 107 while a code is being read. Gate 106 in turn drives a reject circuit 108 which also receives a carton detect signal from amplifier 90 via an input 109. The outputs $101_{1-6}$ from the first six stages $96_{1-6}$ are connected to a storage register 110 to transfer data from stages $96_{1-6}$ into register 110 upon receipt of a transfer signal from the seventh stage $96_7$. The seventh stage output $101_7$ is also applied via lead 116 to an "or" gate 118 to enable gate 118 and condition gate 118 for reject operation until a complete six bits are entered in register 96.

When a carton detect signal is applied to inputs $98_{1-7}$, register 96 is set as previously described. The first stage in register 96 is conditioned in accordance with the first bit, that is, the presence or absence of a bar, as sensed by photo-cell 72*a*. Immediately thereafter, the first of the clock bars 20 is sensed by photocell 74a and a negative pulse is applied to input 100 to transfer the preset "1" from the first stage to the second stage and enter the first bit in the first stage in a conventional manner. Thus, the pulse code is sampled in accordance with the clock pulses. Register entry and shifting is in response to the leading or negative going transition of a clock pulse. Since this occurs substantially when photocell 72*a* is centered on a code bar 22, entry of a "1" into the first stage 96 is assured when a code bar 22 has been read. The process repeats for each block pulse until all six bits have been entered into register 96. After six bits have been entered into register 96 in response to six clock bars 20, the "1" initially preset in the first stage will have been shifted to the seventh stage $96_7$. When the preset "1" is entered in the seventh stage, register 96 provides a transfer signal at output $101_7$ which causes simultaneous transfer of the six bits in the remaining stages (stages $96_{1-6}$) to a storage register 110. Entry of the preset "1" into the seventh stage $96_7$ also disables gate 102 (via input 104) and removes the reject signal at gate 118 (via lead 116). By using a seven stage register to identify a six bit code, register 96 will not provide the required transfer signal if six clock bars have not been read and counted. This condition will occur when an end flap 16 is blank or when the end flap has been torn off or destroyed before the carton reaches the inspection station 10. Thus, the seventh stage $96_7$ also insures that all six bits have been read before transfer to register 110, and if they have not been read, the seventh stage $96_7$ is in its "0" state to cause a reject via gates 118, 106 at the end of the carton detect signal.

Register 110 provides a six bit output to a digital comparator 114 and also provides the same six bits to a code read indicator 120. Indicator 120 comprises six lamps, one in each of the buttons 40 on the front panel 38 (FIG. 1) and the lamps are selectively lit according to the data read by photocells 70*a*, 72*a*, 74*a* and entered in register 110. In the preferred embodiment, the indicator 120 is driven only by the storage register 110 in channel A. Comparator 114 also receives a six bit reference code from a code input circuit 123 as set on the buttons 40 (FIG. 1). The code set on the buttons 40 is entered into comparator 114 through an input-output circuit 113 under control of a transfer and clear circuit 112 (buttons 42, 44, FIG. 1). Data can also be transferred from comparator 114 to register 110 via an input-output circuit 115 under control of circuit 112. Comparator 114 continuously samples and compares the data in register 110 against the reference code set by the code input 123. Comparator 114 provides a reject output via lead 124 to gate 118 if any one of the six bits in register 110 differs from the corresponding bit entered via the code input 40. Gate 118 drives input 107 of gate 106 and gate 106 in turn drives the reject circuit 108.

After a carton 14 has passed head 58*a* and the carton detect signal 91 is removed from input 105, the reject circuit 108 will be actuated if there is an input at 107. The proper input is at 107 via gate 118 if six bits were not entered in register 96 or if any one of the bits entered in the storage register 110 is not true to the reference code. The reject circuit 108 operates a counter 130, lights 50, 52 (FIGS. 1 and 5) and alarm 48 (FIGS. 1, 5 and 12). A reject output from circuit 108 also opens a power switch 136 to disconnect a conveyor drive 138 from a power source 140. The loop including switch 136, drive 138 and source 140 includes a second power switch 142 operated by the corresponding reject signal in channel B so that a reject indication from either of channels A or B will disconnect the drive 138.

Before summarizing the overall operation of the circuit illustrated in FIG. 5, the details of the code amplifiers 92 and the clock amplifiers 94 as well as the reject circuit 108 will be described. Referring to FIG. 11, amplifiers 92 and 94 are substantially identical and only amplifier 92 will be described in detail. The amplifier 92 generally comprises an amplifier per se 148 and a feedback circuit including an output 150 of amplifier 148, a threshold detector 152, a gate 153, a binary counter 154, a digital-to-analog convertor 156 and a feedback input 158 of amplifier 148. There is also a dead-band threshold control 160 coupled between amplifier output 150 and convertor 156. A counting signal is applied to gate 153 at input 162 from a pulse oscillator 164. Oscillator 164 is controlled by a reset circuit 166 in response to a carton detect signal 91 (FIG. 10A) from amplifier 90. Circuit 166 also resets counter 154 at a reset input 163 in response to the signal 91. A full count circuit 168 is coupled between the input and output of counter 154 to prevent recycling after a full count.

The construction and operation of amplifier 92 is best understood in connection with FIGS. 10A and 10C which for purposes of illustration also represent amplitude versus distance waveforms at output 150. The distance axis corresponds to relative travel between a carton 14 and head 26 but will also represent time when the velocity of a carton 14 is constant as illustrated. Register 96 has a critical input switching level $V_D$. For a pulse excursion $\Delta V_S$, the threshold $V_T$ of detector 152 is set at ½ $\Delta V_S$ above $V_D$. Amplifier 148 has a normal gain such that for the lowest expected input level $V_{IN}$ (FIG. 11), the lowest uncompensated output level $V_O$ substantially exceeds $V_T$. The dead-band control 160 has a threshold set at substantially $V_D$ and is arranged to cause a small voltage jump $V_t$, either positive or negative, at output 150 to provide a dead-band of $2V_t$ about the level $V_D$. $V_t$ is selected in accordance with the expected noise and the sensitivity of register 96 about the input level $V_D$. By way of illustration, in one application, the above voltages were approximately as follows: $V_O$=4 volts; $V_D$=0.8 *v;* $\Delta V_S$=1.6 *v;* $V_T$=1.5 *v;* and $2V_t$=100 mv about $V_D$.

When a carton 14 is sensed by photocell 70*a*, reset circuit 166 monentarily inhibits oscillator 164 while counter 154 is being reset by reset signal from circuit 166. Since the carton detect photocell 70*a* slightly leads the code photo-cell 72*a*, the pulse code 93 is slightly behind the carton detect signal 91. The output of amplifier 148 at 150 tries to go to the $V_O$ level and exceeds the threshold $V_T$ to enable gate 153 and apply the counting signal from oscillator 164 to counter 154. The count progresses so long as the amplifier output exceeds $V_T$. The digital signal from counter 154 is converted to an analog signal, $-V_F$, which is fed back to input 158 to reduce the input level to amplifier 148 and pull the amplifier output level back toward $V_T$. The analog signal $-V_F$ is proportioned to the count in counter 154. When the output at 150 drops just below $V_T$, gate 153 is disabled and the accumulated count is held. This action occurs instantaneously so that the maximum output level at 150 is clamped substantially at $V_T$ before the first code pulse and during the remainder of the pulse code signal 93 as indicated in dotted lines (FIG. 10C) until reset by the next carton. If the output again exceeds $V_T$ before counter 154 is reset, the counter will be enabled to bring the level down to $V_T$.

The clamping action is modified slightly by control 160 which senses the output at 150 and provides regenerative feedback superimposed on $-V_F$. When the output at 150 exceeds $V_D$, control 160 is activated and provides a fixed incremental feedback that causes the output to jump by an amount $V_t$ above $V_D$. Similarly, when the output drops below $V_D$, control 160 jumps the output by an amount $V_t$ below $V_D$. For example, based on the above values, when the output increases above 0.8 *v*. it is jumped to 0.85 *v* and then as it drops below 0.8 *v* it jumps to 0.75 *v*. Thus, variations smaller than $V_t$ are suppressed so that the system does not oscillate about the input level $V_D$ in response to noise. Stated differently, the dead-band control 160 assures that the first counting stage $96_1$ in register 96 is either fully "on" or fully "off."

The gain compensating circuit together with the dead-band control effectively compensates for noise and environmental changes such as lamp intensity, dust accumulation on the cartons, color changes, ink density and other variations of the cartons. Another important feature is that long term stabilization or long term d.c. clamping is provided. The conveyor 12 can be stopped while a carton is being read and the proper output level is retained indefinitely by the count held in counter 154. The conveyor can be restarted after some delay without upsetting the code reading that was interrupted and without causing reject of a carton that is in face properly labeled.

The reject circuit 108 (FIGS. 5 and 12) generally comprises four gates functionally identified as a code reject gate 170, a reset gate 172, a carton counting gate 174 and a lamp burn-out gate 176. Gate 170 is enabled by an input from either gate 107 (FIG. 5 via input 180) or gate 172 or gate 176. Gate 170 in turn operates the power switch 136 (FIGS. 5 and 12) and enables gate 172 to in turn operate the alarm 48 and the channel A reject lamp 50 (FIGS. 1 and 12) and hold the reject gate 170. Gate 172 has a disabling input 178 which is pulsed in response to operating the code transfer button 42. Gate 172 in turn disables gates 170, 174 to reset the reject circuit 108 when the button 42 is punched. Gate 174 has an enabling input 109 connected directly to amplifier 90. Each carton 14 sensed by photocell 70a enables gate 174 and operates counter 130 to indicate the number of cartons that have been packaged. Gate 176 has an enabling input under control of lamp 86*a* (FIGS. 5 and 12) which provides illumination for photocells 70*a*, 72*a* and 74*a*. If lamp 86*a* burns out, gate 176 is gated "on" to enable reject gate 170. Gate 176 is disabled by replacing lamp 86*a*.

Figure 2:
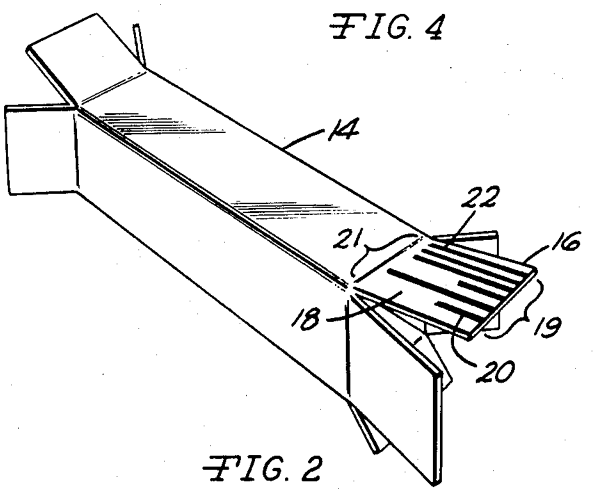
FIG. 2 is a perspective view of a carton marked with a basic bar code of the present invention.

To summarize the operation, the drug or other item being packaged is assumed to be identified by the binary code "010111" and cartons 14 are so marked as illustrated in FIGS. 2 and 3A. The code is punched on push buttons 40 as described in conjunction with FIG. 4 and is entered into comparator 114 and also register 110 by operating the transfer button 42 (FIG. 1) in the circuit 112 (FIG. 5). When the transfer button is operated, the code is entered directly into comparator 114 through circuit 113 and then entered into register 110 through circuit 115. The code set on buttons 40 is initially entered into register 110 so that the comparator 114 gets an accept mode and the system will start. Unless some such provision is made, the comparator might initially provide a reject indication depending on the code that happened to be in register 110. Transfer button 42 also resets the reject circuit 108 via gate 172. The photocells 70, 72 and 74 in channels A and B have been properly aligned as illustrated in FIG. 8B and previously described.

When conveyor 12 is started, cartons 14 move past the scanning head 26 and each of the individual heads 58*a*, 58*b* first detect the presence of a carton via photocell 70 and provide a carton detect signal 91 to register 96, gate 106 and gate 174 in the reject circuit 108. So long as a carton detect signal is present at gate 106, any reject from gate 118 is not transferred to gate 170 in the reject circuit 108. The carton detect signal at gate 174 adds one count in counter 130 and the carton detect signal to register inputs $98_{1-7}$ sets all of the stages in the register as previously described. As code bars 22 are sensed by photocell 72*a*, the photocell provides the pulse code 93 which is applied to input 99 of register 96. Clock bars 20 sensed by photocell 72*a* are converted into the clock pulse train 95 and fed via gate 102 to register 96.

In accordance with an important feature of the present invention, shifting in register 96 is controlled by the clock bars 20 and not by fixed internal timing. Thus, the first code pulse for the first code bar 22, the far right-hand bar as viewed in FIG. 3A, conditions the first stage of register 96 at "1" but it is not entered into the first stage until register 96 receives the first clock pulse at input 100. The first clock pulse also shifts the preset "1" to the second stage. This insures that the code is entered into register 96 bit-by-bit only upon enabling by a respective clock bar 20 for each of the bits. Thus, consecutive bits are read time independently regardless of speed variations and stopping of conveyor 12 or variations in spacing between bars.

After the sixth bit is entered in register 96, the "1" preset into the first stage $96_1$ has reached the seventh stage $96_7$ and the code is transferred automatically to the storage register 110. Simultaneously, register stage $96_7$ inhibits gate 102 to block further entry into register 96. If a complete code is not entered into register 110, gate 118 remains enabled via lead 116. Assuming a six bit code was read, the enabling signal at gate 118 from stage $96_7$ is removed and the six bit code is entered in register 110. The code read indicator 120 provides an instantaneous indication of the code via the lights in the push buttons 40 on the front panel 38. Simultaneously, the code in register 110 is compared to the code in comparator 114 and if any one of the six bits is not true to the corresponding bit set of the code switches 40, a reject output is provided to gate 118. So long as a reject output is not applied to gate 118, cartons continue to pass the reading head 126 without interruption. Each carton detect signal resets register 96. Identical code reading and comparing for each carton is also taking place in channel B substantially simultaneously.

Assuming that gate 118 receives a reject input from either register 96 (via lead 116) or comparator 114 (via lead 124), gate 118 conditions gate 106 (via input 107). As soon as the carton moves out of view from photocell 70a, removing the carton detect signal at the other input 105 of gate 106, gate 106 enables gate 170 in reject circuit 108 via lead 180. Gate 170 simultaneously opens the power switch 136 and via gate 172 actuates light 50 and alarm 48. Similarly, the redundant inspection by channel B will provide a reject indication in the event that the code read and stored in register 110*b* does not compare with the code in comparator 114*b*. Reject operation in channel B is substantially identical to that in channel A to open power switch 142, actuate alarm 48 and light the channel B reject light (52, FIGS. 1 and 5). With the power switches 136, 142 open, conveyor 12 stops and the carton having a defective code is removed from conveyor 12. Power switches 136, 142 could be eliminated and the line shut down manually in response to a reject indication by alarm 48 or lights 50, 52. Automatic sorting of a reject carton is also contemplated so that the packaging line does not have to be shut down. After a reject, the code transfer button 42 must be operated to reset the reject circuit 108 (via gate 172) and provide an accept mode at comparator 114 as previously set forth.

Figure 3B:
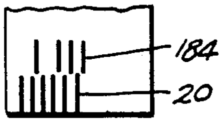

Another important feature of the present invention is the large code repertoire that is available based on the basic six bit code and system described hereinabove with only simple modification. One such modification is illustrated in FIG. 3B wherein the digit places and corresponding code bars 184 are offset to the right between clock bars 20. For cartons moving in a direction from left to right as viewed in FIG. 1, the code of FIG. 3B is termed a phase leading code. Each phased bar 184 or more precisely, each bit, is paired with a respective clock bar 20. Photocells 70, 72, 74 must be rotated clockwise as shown in FIG. 9B relative to their orientation for the normal code (FIG. 8B). In FIG. 9B, the offset between photocells 72, 74 is still equal to one-half the bar width so that photocell 72 is centered on bar 184 when photocell 74 is centered on the leading edge of the paired clock bar 20. FIG. 9A shows photo-cells oriented for the phase leading code and viewing a normal code such as in FIG. 3A. As shown in FIG. 9A, the horizontal spacing between photocells 72, 74 prevents proper coincidence of clock and code pulses at inputs 99, 100 of register 96. Thus, a normal code cannot be misread as a phase leading code if an all zero code is never used. A phase lag code is also contemplated by offsetting the code bars to the left of the clock bars. It will be apparent that a given system cannot use both a phase leading and a phase lagging code unless special precautions are taken in selecting the width and spacing of the bars.

Figure 3C:
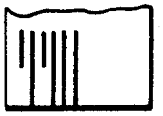

Another modification contemplated by the present invention is an inverted code such as illustrated in FIG. 3C with code bars printed below clock bars. This code is read and compared with the circuit of FIG. 5 by simply inserting a reversing switch 188 (FIG. 13) or equivalent electronic switching between photocells 72, 74 and the respective inputs 99, 100 of register 96. With switch 188 to the right as viewed in FIG. 13, on contacts 190, the normal code (FIG. 3A) can be read in the manner previously described. With the reversing switch thrown to the left onto contacts 192, the inverted code (FIG. 3C) can be read.

Figure 3D:

The basic code can also be expanded to a twelve bit code such as illustrated in FIG. 3D by increasing the number of stages in registers 96 and 110 and in comparator 114 and adding a second set of input buttons. Preferably, the basic system is arranged so this modification can be implemented with plug-in modules that connect six additional stages in series between the initial six stages in the registers 96 and 100 and comparator 114 and their respective outputs. Thus, as the demands of a user increase, he can add the twelve bit code to the basic system at low cost and substantially increase the code repertoire.

Figure 3E:
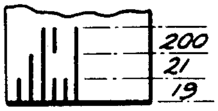

Another relatively simple modification is a stacked twelve bit code illustrated in FIG. 3E. The stacked twelve bit code includes a second six bit row 200 printed above the original six bit code corresponding to code 22. Reading heads having four aligned photocells are employed. For simplicity, two of these photocells are identified in FIG. 14 with reference numerals corresponding to the photocells 74a, 72a in FIGS. 5 and 6 since their function and connection in the circuit is substantially identical to that previously described. A third photocell 202*a* is arranged above and in line with photocell 72*a* in the manner of photocell 70*a* (FIGS. 5 and 6). The fourth photocell 203*a* is above and in line with photocells 202*a*, 72*a* and 74*a*. Photocell 202*a* is connected through an amplifier 204 to a second group of digital logic added for the second six bit code 200. The additional logic includes a second input shift register 206, a second storage register 208 and a second digital comparator 210 which correspond in function to the registers 96, 110 and comparator 114 for photocells 72, 74 in FIGS. 5 and 14. Comparators 114, 210 each have a six bit input to set the reference code therein. The signal from photocell 203*a* is a carton detect signal corresponding to the signal 91 from photocell 70*a* (FIGS. 5 and 10). However, the signal from photocell 203*a* is connected through an amplifier 212 to both registers 206, 96 to set (preset and reset) both registers each time a carton is detected. Similarly, the clock pulse train from amplifier 94 (FIG. 14) is applied to both registers 206, 96 to shift the numbers in the registers each time a bit is read. With the bars in rows 19, 21, 200 aligned, each bit in rows 21, 200 is paired to a clock pulse for time coincidence reading of each clock pulse and its corresponding bit at register 96 and at register 206. Operation of the apparatus with a stacked twelve bit code will be apparent based on the operation previously described for the basic or normal code apparatus. It will also be apparent that while the twelve bit code illustrated in FIG. 3D is essentially a series modification to the basic code of FIG. 3A, the stacked twelve bit code of FIG. 3E is essentially a parallel modification of the basic code. However, in both situations, each code bit is properly entered and shifted in the input shift registers only after the registers are enabled by a respective paired clock pulse.

By way of example, the above basic code and basic modifications in the codes can provide in excess of 24,000 different codes with only slight modifications such as with plug-in modules for the basic inspection device. With the basic six bit code, such as illustrated in FIG. 3A, a code containing all bars or no bars is usually omitted and thus there are 62 codes available. With the basic code and the inverted code variation (FIG. 3C), an additional 62 codes are available so that the total number of codes is 124. Although an inverted code could use at least one code having either all bars or no bars, as a parctical matter neither of these two codes are used. By using the basic code together with the inverted modification and also using either phase lagging or phase leading codes (FIG. 3B), there will be a total of 248 codes available. The twelve bit code (series modification, FIG. 3D) combined with normal, inverted and phase variations, provides on the order of 16,364 codes. Finally, with the stacked code (FIG. 3E), including normal and corresponding inverted and phased variations with either or both of the code rows, on the order of 24,000 codes can be obtained. It will be apparent that both the series code (FIG. 3D) and the parallel (stacked) code (FIG. 3E) can be further expanded to 16 bits, 18 bits, 24 bits etc. to obtain an almost infinite number of codes. The principal limitation is the available space on the carton, literature or the like.

It will be understood that the method and the apparatus for packaging inspection and verification have been described and disclosed hereinabove for purposes of illustration and do not define limits of the present invention, the scope of which is set forth in the following claims.

1. An amplifier circuit comprising amplifier means having an input circuit adapted to receive an input signal whose envelope is a series of excursions, said envelope excursions being subject to random variations in duration and in pack amplitude in one direction, said excursions further having information thereon represented by amplitude variations in an opposite direction occurring during at least a portion of each envelope excursion, an output circuit to develop an output signal that is an amplified version of said input signal, and compensation circuit means coupled between said input circuit and said output circuit to maintain peak envelope amplitudes in said output signal at or below a predetermined level, said compensation circuit means comprising threshold circuit means responsive to said output signal to detect deviations therein above said predetermined level and provide a threshold output signal, digital circuit means enabled by said threshold output signal to provide a digital signal representing said output deviation, and digital-to-analog conversion means responsive to said digital signal to provide an analog signal representing said deviation, said analog signal being coupled to said amplifier input circuit so as to compensate said input signal when said output signal exceeds said predetermined level without changing the gain of said amplifier means to thereby cause peak envelope amplitudes of said output signal to be clamped at or below said predetermined level while information variations in said output signal are substantially unchanged as compared to such information variations in said output signal without such compensation.

2. The amplifier circuit set forth in claim 1 wherein said digital circuit means comprises counting means enabled by said threshold output signal.

3. The amplifier circuit set forth in claim 2 wherein said digital circuit means further comprises gate means and oscillator means coupled to said counter means via said gate means, said gate means being enabled by said threshold out-put signal to repetitively increment said counter in response to a counting signal from said oscillator means so long as said output signal exceeds said predetermined level.

4. The amplifier circuit set forth in claim 2 wherein said digital circuit means further comprises reset circuit means for resetting said counter means prior to occurrence of said information portion in each of said envelope excursions whereby said analog signal can be maintained at said input circuit until said counter is reset.

5. The amplifier circuit as set forth in claim 4 wherein said digital circuit means further comprises gate means and oscillator means coupled to said counter means via said gate means, said gate means being enabled by said threshold out-put signal to repetitively increment said counter in response to a counting signal from said oscillator means so long as said output signal exceeds said predetermined level.

6. The amplifier circuit set forth in claim 2 wherein said information amplitude variations are pulse codes occurring during each envelope excursion with pulses in said codes having a predetermined amplitude relative to said peak envelope amplitude, and wherein said amplifier circuit further comprises a second threshold detector means to provide an incremental dead-band control signal when said output signal passes through a second predetermined level below said first-mentioned predetermined level, said incremental control signal being coupled to said input circuit along with said analog signal to suppress oscillation of said output signal about said second predetermined level.

7. An amplifier circuit comprising amplifier means having input means adapted to receive an input signal that comprises a series of generally square waves having amplitude variations therein representing predetermined information, said amplifier means having output means to develop an amplified version of said input signal and further having a predetermined gain such that peak amplitude of an uncompensated output signal would exceed a predetermined level, said amplifier circuit further comprising circuit means coupled between said output means and said input means to clamp peak amplitudes of said output signal at said predetermined level while maintaining said predetermined gain comprising threshold circuit means coupled to said output means to detect deviations in said output signal above said predetermined level and provide a threshold output signal, counting circuit means enabled by said threshold output signal to provide a digital number signal representing said output deviation and digital-to-analog conversion means responsive to said digital number signal to provide an analog signal whose level varies according to said deviations above said predetermined level, said analog feedback signal being coupled to said amplifier input means so as to clamp said peak amplitudes of said out-put signal at said predetermined level while information variations in said output signal are substantially unchanged as compared to said information variations in said uncompensated output signal.

* * * * *